US009081524B2

(12) United States Patent
Yamada et al.

(10) Patent No.: US 9,081,524 B2
(45) Date of Patent: Jul. 14, 2015

(54) PRINTING SYSTEM AND PRINTING APPARATUS (71) Applicant: Konica Minolta, Inc., Chiyoda-ku (JP)

(72) Inventors: Masami Yamada, Sennan-gun (JP); Atsushi Ohshima, Amagasaki (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/333,607

(22) Filed: Jul. 17, 2014

(65) Prior Publication Data
US 2015/0022840 A1 Jan. 22, 2015

(30) Foreign Application Priority Data

Jul. 22, 2013 (JP) ................................. 2013-151973

(51) Int. Cl.
H04N 1/04 (2006.01)
G06F 3/12 (2006.01)
G06K 15/02 (2006.01)

(52) U.S. Cl.
CPC ............ G06F 3/1221 (2013.01); G06F 3/1231 (2013.01); G06F 3/1237 (2013.01); G06K 15/1805 (2013.01)

(58) Field of Classification Search
CPC ... G06F 3/1221; G06F 3/1231; G06F 3/1237; G06K 15/1805
USPC ................................. 358/1.13, 1.9, 1.15, 474
See application file for complete search history.

(56) References Cited

U.S. PATENT DOCUMENTS

| 2007/0177919 | A1 | 8/2007 | Saitoh et al. |
| 2007/0201089 | A1 | 8/2007 | Yamamoto |
| 2009/0282278 | A1 | 11/2009 | Satoh |
| 2010/0214602 | A1* | 8/2010 | Moriwaki ................ 358/1.15 |
| 2011/0248568 | A1* | 10/2011 | Morgan et al. ................ 307/75 |

FOREIGN PATENT DOCUMENTS

| JP | H10-175353 A | 6/1998 |
| JP | 2002-072761 A | 3/2002 |
| JP | 2007-203529 A | 8/2007 |

(Continued)

OTHER PUBLICATIONS

Notification of Reasons for Refusal dated May 7, 2015 issued in the corresponding Japanese Patent Application No. 2013-151973 and English translation (8 pages).

Primary Examiner — Houshang Safaipour
(74) Attorney, Agent, or Firm — Buchanan Ingersoll & Rooney PC (57) ABSTRACT A printing system includes an information processing apparatus and a printing apparatus, the information processing apparatus including a printer driver, the print job packet containing a print job described in printer description language, the printing apparatus including: an engine including a fuser; a main CPU that performs operation control of the engine; a power supply portion that performs the following: providing power to the main CPU and delivering power to the engine by the main CPU performing the energization control while normal operation mode is ON; and shutting down power to the main CPU and the engine while power saving mode is ON; and a sub CPU that performs the following: receiving power from the power supply portion while power saving mode is ON; and giving a proxy response to the print job packet to activate the main CPU, the sub CPU consuming less power than the main CPU.

8 Claims, 6 Drawing Sheets (56) References Cited

FOREIGN PATENT DOCUMENTS

| JP | 2007-223275 A | 9/2007 |
| JP | 2008-168539 A | 7/2008 |
| JP | 2009-294927 A | 12/2009 |
| JP | 2010-288225 A | 12/2010 |
| JP | 2011-037126 A | 2/2011 |

* cited by examiner

PRINTING SYSTEM AND PRINTING APPARATUS

This application claims priority under 35 U.S.C. §119 to Japanese Patent Application No. 2013-151973 filed on Jul. 22, 2013, the entire disclosure of which is incorporated herein by reference in its entirety.

BACKGROUND OF THE INVENTION

1. Field of the Invention

The present invention relates to: a printing system having an information processing apparatus such as a personal computer and a printing apparatus such as a multi-function peripheral (MFP), i.e., a multifunctional digital machine, both of which are capable of being connected to each other through a network; and a printing apparatus to be employed in the printing system.

2. Description of the Related Art

The following description sets forth the inventor's knowledge of related art and problems therein and should not be construed as an admission of knowledge in the prior art.

There has been a printing apparatus such as an MFP as described above, having a main CPU that controls an engine including a fuser and all the other portions of the printing apparatus. In order to achieve less power consumption, the printing apparatus supports power saving mode such as what is called "deep sleep mode", by which power to the main CPU as well as to the engine is shut down.

Without power, the main CPU cannot recognize a print job received through the network, for example from a user terminal.

As a solution to such a problem, there has been a printing apparatus further having a sub CPU that receives power and works even in deep sleep mode and consumes less power than a main CPU.

The printing apparatus having the sub CPU receives a connection request packet such as a print job packet from the network while deep sleep mode is ON. Subsequently, the sub CPU returns a proxy response to activate the main CPU and its peripheral circuitry then transfers the received packet to the main CPU. The main CPU judges that it is a print job packet after analyzing the packet and activates the fuser and others by delivering power to the engine and others from the power supply portion. The main CPU then executes a print job.

The printing apparatus having the main CPU and the sub CPU has the following problem: it takes time for the main CPU to prepare for activating the engine because the main CPU needs to have been activated by the sub CPU that received a packet then judged that it was a print job packet, as described above. More specifically, a fuser in the engine requires a certain amount of heating time to reach an appropriate temperature, thus a slow activation of the fuser eventually retards the times for starting and finishing the print job.

The main CPU can be configured to activate the engine prior to judging that the receive packet is a print job, which could lead to a waste of power consumption because the engine may be activated for a non-print job.

Japanese Unexamined Patent Publication No. 2011-037126 discloses a power save controller device that allows a quicker preparation for image forming than in the case where power saving condition is cancelled after an instruction for image forming is given. The power save controller device comprises: a receiver that receives information objects from an external apparatus through a communication line; a memory that stores a specific information object other than an instruction information object related to instructions for image forming, the specific information object having being received by the receiver within a predetermined time period until the instruction information is received by the receiver; and a controller that cancels power saving condition in the case where both the following conditions are satisfied: (1) a main controller in need of power saving is in power saving condition, consuming less power than in normal condition; and (2) an information object received by the receiver matches the specific information object stored on the memory.

Japanese Unexamined Patent Publication No. 2010-288225 discloses a data processing apparatus that performs responding appropriately depending on the condition of receiving a packet through a network while achieving less power consumption. The data processing apparatus comprises a packet processor that transmits a reply data object to a source of a received packet if the received packet has a proxy response pattern, the reply data object corresponding to the proxy response pattern and updates judgment information if the condition of receiving a packet having a possible proxy response pattern is a specific one, the judgment information being stored on a memory such that the packet having the possible proxy response pattern is identified as having the proxy response pattern.

According to the technique as described in Japanese Unexamined Patent Publication No. 2011-037126, when a SNMP description is received it is judged whether or not it has a source IP address and an object identifier (OID) having ever been received; if it has a source IP address and an OID having ever been received, it seems most likely that a printer driver has just been activated to prepare for a print job to be received soon, thus sleep mode is turned OFF prior to receipt of it.

The technique has a problem that a print job may not always be received soon and sleep mode may be turned OFF long prior to receipt of it, which would lead to a waste of power consumption. Furthermore it is inconvenient that only an information processing apparatus having ever given instructions for printing can take advantage of the technique.

According to the technique as described in Japanese Unexamined Patent Publication No. 2010-288225, a packet having a possible proxy response pattern can be changed depending on the condition of receiving it while a quicker preparation for printing back from sleep mode cannot be achieved.

The description above can be summarized as follows: (1) it takes time for a conventional printing apparatus having a sub CPU to start printing because it takes time for its engine including a fuser to recover from power saving mode, which has so far been an unsolved problem; and (2) the main CPU can be configured to activate the engine prior to judging whether or not the received packet is a print job, which could lead to a waste of power consumption because the engine may be activated for a non-print job. Japanese Unexamined Patent Publications No. 2011-037126 and No. 2010-288225 did not solve these problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a printing system comprising an information processing apparatus and a printing apparatus, the information processing apparatus and the printing apparatus both being capable of being connected to each other through a network, the information processing apparatus comprising a printer driver that transmits a print job packet to the printing apparatus, the print job packet containing a print job described in printer description language, the printing apparatus comprising:

an engine including a fuser;

a main CPU that performs operation control of the engine, the operation control including energization control;

a power supply portion that performs the following: providing power to the main CPU and delivering power to the engine by the main CPU performing the energization control while normal operation mode is ON; and shutting down power to the main CPU and the engine while power saving mode is ON; and a sub CPU that performs the following: receiving power from the power supply portion while power saving mode is ON; and giving a proxy response to the print job packet to activate the main CPU, the print job packet being received from the information processing apparatus, the sub CPU consuming less power than the main CPU, wherein:

the printer driver of the information processing apparatus further transmits a preceding packet to the printing apparatus prior to transmitting the print job packet, the preceding packet including a command that instructs the printing apparatus to provide power to the engine; and upon receiving the preceding packet, the sub CPU of the printing apparatus allows the power supply portion to start providing power to the engine by energization start control as instructed by the command.

A second aspect of the present invention relates to a printing apparatus capable of being connected to an information processing apparatus through a network, the information processing apparatus comprising a printer driver that transmits a print job packet to the printing apparatus, the print job packet containing a print job described in printer description language, the printing apparatus comprising:

an engine including a fuser;

a main CPU that performs operation control of the engine, the operation control including energization control;

a power supply portion that performs the following: providing power to the main CPU and delivering power to the engine by the main CPU performing the energization control while normal operation mode is ON; and shutting down power to the main CPU and the engine while power saving mode is ON; and a sub CPU that performs the following: receiving power from the power supply portion while power saving mode is ON; and giving a proxy response to the print job packet to activate the main CPU, the print job packet being received from the information processing apparatus, the sub CPU consuming less power than the main CPU, wherein:

the printer driver of the information processing apparatus further transmits a preceding packet to the printing apparatus prior to transmitting the print job packet, the preceding packet including a command that instructs the printing apparatus to provide power to the engine; and upon receiving the preceding packet, the sub CPU allows the power supply portion to start providing power to the engine by energization start control as instructed by the command.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4A-H are timeline charts from receipt of a preceding packet to finish of printing.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
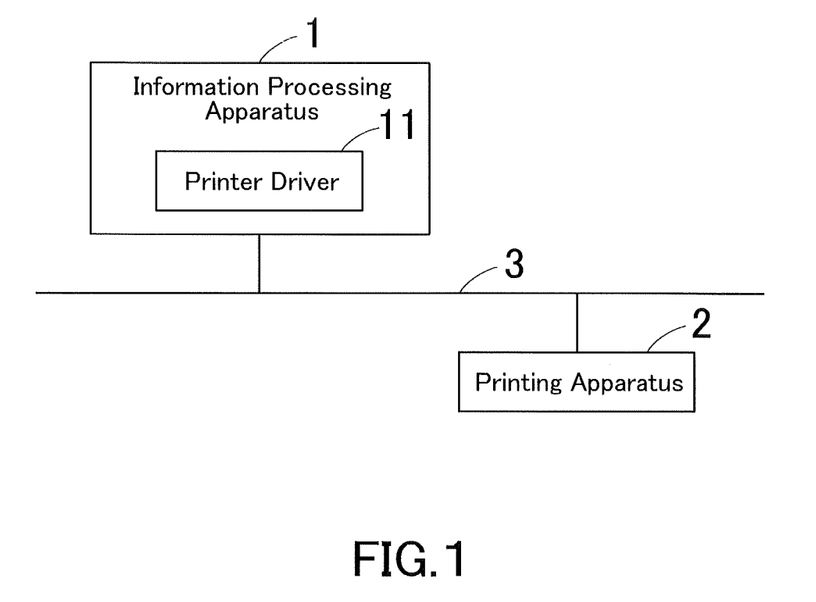
FIG. 1 illustrates a configuration of a printing system according to one embodiment of the present invention.

FIG. 1 illustrates a configuration of a printing system according to one embodiment of the present invention.

As illustrated in FIG. 1, the printing system has an information processing apparatus 1 and a printing apparatus 2 both of which are connected to each other through a network 3.

The information processing apparatus 1, which consists of a personal computer, is provided with a printer driver 11 that transmits a print job packet to the printing apparatus 2. In this embodiment, the printer driver 11 is configured to transmit a preceding packet to the printing apparatus 2 prior to transmitting a print job packet to the same, which will be later described in detail.

The printing apparatus 2, which consists of an MFP such as a multifunctional digital machine as mentioned previously, receives a print job from the information processing apparatus 1 through the network 3 and performs printing.

Figure 2:
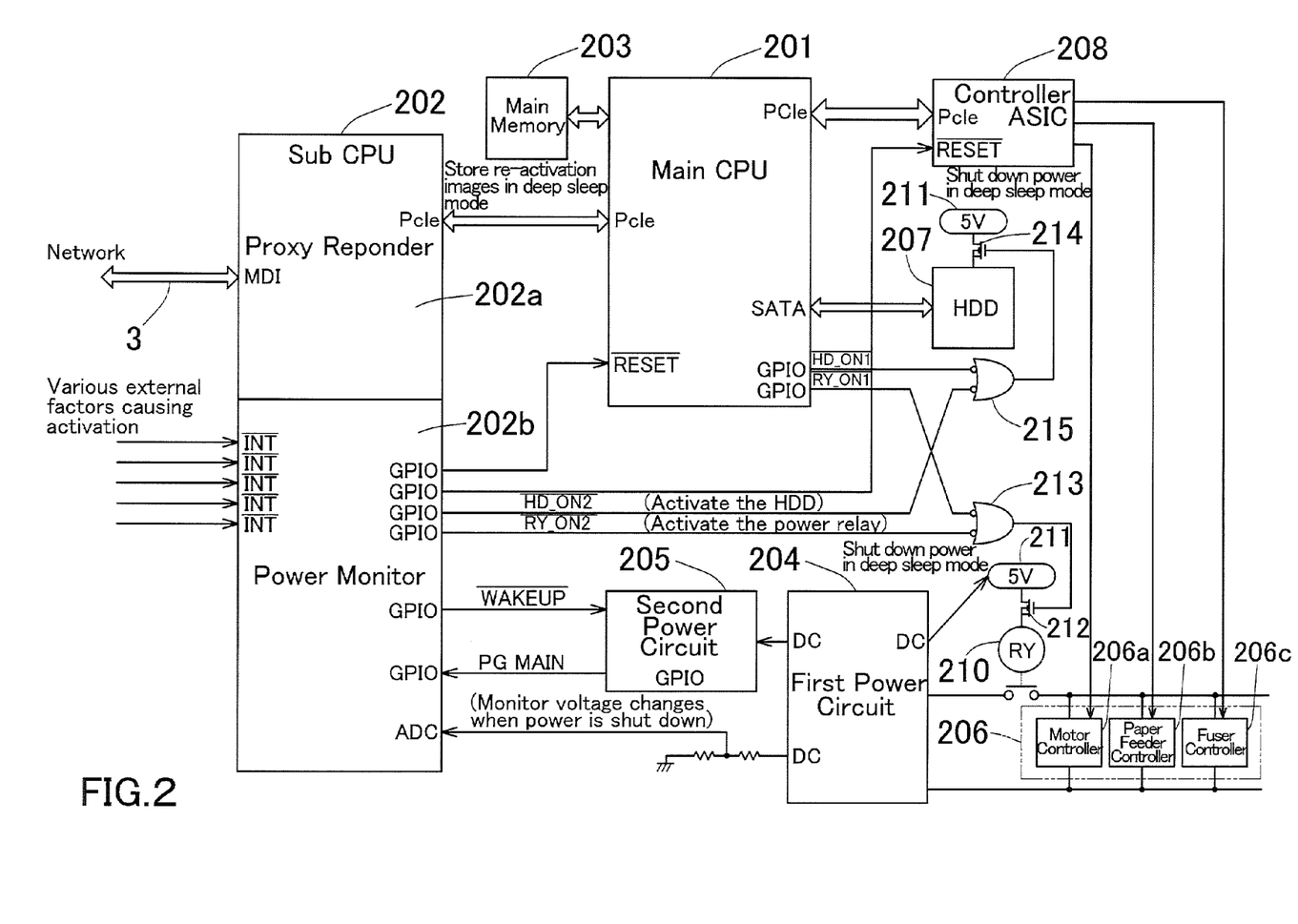
FIG. 2 is a block diagram illustrating a main section of a printing apparatus which includes a controller.

FIG. 2 is a block diagram illustrating a main section of the printing apparatus 2, which includes a controller.

The printing apparatus 2 is provided with: a main controller including a main CPU 201 (hereinafter will be referred to as "main CPU"); a sub controller including a sub CPU 202 (hereinafter will be referred to as "sub CPU"); a main memory 203; a first power circuit 204; a second power circuit 205; an engine 206; a hard disk drive (HDD) 207; a controller ASIC 208; and others.

The main CPU 201 controls the entire printing apparatus 2 including the engine 206 and the hard disk drive 207. The control of the main CPU 201 includes energization control: providing and shutting down power to the engine 206, the hard disk drive 207, and others.

More specifically, in this embodiment, while normal operation mode is ON, power is delivered to the engine 206 from the first power circuit 204 by closing a contact of a relay 210 that is set on a power supply line extending from the first power circuit 204 to the engine 206. While power saving mode is ON, power delivered to the engine 206 from the first power circuit 204 is shut down by opening the contact of the relay 210. Closing and opening the contact of the relay 210 are performed by turning ON and OFF a first switching element 212 that is disposed between the relay 210 and a DC power supply 211 that drives the relay 210.

A first OR circuit 213 has an output terminal connected to the first switching element 212; the main CPU 201 and the sub CPU 202 have output terminals connected to an input terminal of the first OR circuit 213. At least one of the main CPU 201 and the sub CPU 202 outputs an ON signal for the first switching element 212, thus the first switching element 212 is turned ON because of the first OR circuit 213 then closes the contact of the relay 210, allowing the first power circuit 204 to deliver power to the engine 206. Without an ON signal for the first switching element 212 from either of the main CPU 201 and the sub CPU 202, the first switching element 212 is turned OFF then opens the contact of the relay 210, allowing the first power circuit 204 to shut down power to the engine 206.

As for the hard disk drive 207, while normal operation mode is ON, the DC power supply 211 that drives the hard disk drive 207 provides power to the hard disk drive 207; while power saving mode is ON, the DC power supply 211 shuts down power to the hard disk drive 207. The DC power supply 211 provides power to the hard disk drive 207 by turning ON and OFF a second switching element 214 disposed between the DC power supply 211 and the hard disk drive 207.

A second OR circuit 215 has an output terminal connected to the second switching element 214; the main CPU 201 and the sub CPU 202 have output terminals connected to an input terminal of the second OR circuit 215. At least one of the main CPU 201 and the sub CPU 202 outputs an ON signal for the second switching element 214, thus the second switching element 214 is turned ON because of the second OR circuit 215, allowing the DC power supply 211 to provide power to the hard disk drive 207. Without an ON signal for the second switching element 214 from either of the main CPU 201 and the sub CPU 202, the second switching element 214 is turned OFF, allowing the DC power supply 211 to shut down power to the hard disk drive 207.

Furthermore, in this embodiment, while power saving mode called "deep sleep mode" is ON, the main CPU 201 stops working to enter power saving state without power from the second power circuit 205.

The sub CPU 202 is provided with: a proxy responder 202a that performs activation processing when receiving a packet through the network 3 and performs proxy response processing when required; and a power monitor 202b that detects a network-free factor causing activation and monitors power. The sub CPU 202 may be composed of one or two CPUs. The sub CPU 202 works consuming less power than the main CPU 201.

The printing apparatus 2 receives a connection request packet from the network 3 while the main CPU 201 loses power; subsequently, the proxy responder 202a returns a proxy response and the power monitor 202b outputs a WAKEUP signal to the second power circuit 205 to provide stabilized voltage to the main CPU 201 and reset it. As a result, the main CPU 201 and its peripheral circuitry including the controller ASIC 208 are successfully activated. The sub CPU 202 also transfers the received packet to the main CPU 201. The main CPU 201 and the sub CPU 202 are capable of communicating with each other through PCI-Express.

Upon the proxy responder 202a receiving a preceding packet generated by the printer driver 11 of the information processing apparatus 1 as mentioned previously, the power monitor 202b outputs ON signals for the first switching element 212 and the second switching element 214 to deliver power to the engine 206. As a result, the hard disk drive 207 is successfully activated. To achieve this, the power monitor 202b has general purpose input/output (GPIO) terminals in addition to GPIO terminals of the main CPU 201. Upon receiving a preceding packet from the printer driver 11, the power monitor 202b delivers power to the engine 206 and activates the hard disk drive 207 through the GPIO output terminals before the main CPU 201 delivers power to the engine 206.

The main memory 203 stores re-activation images while power saving mode is ON.

The first power circuit 204 is a power circuit that receives commercial power supply. The first power circuit 204 has the DC power supply 211 that provides power to the engine 206 and drives the relay 210 and the hard disk drive 207.

The second power circuit 205 is a voltage stabilizer power supply that stabilizes DC power supply voltage from the first power circuit 204, serving as a power supply for the main CPU 201, the sub CPU 202, and others.

The engine 206 has a function of forming an image, i.e., print data included in a print job and outputting it on paper. In this embodiment, the engine 206 includes: a motor controller 206a; a paper feeder controller 206b; and a fuser controller 206c. The motor controller 206a includes: driven portions such as a photoconductor drum; and a driver motor that drives each of the driven portions; the paper feeder controller 206b includes portions related to paper feeding to have images printed thereon; the fuser controller 206c includes portions related to fusing, for example a fuser.

The hard disk drive 207 is a non-volatile recording medium that stores image data and other various types of data such as application data. The hard disk drive 207 may be needed when the main CPU 201 develops print data into a printable image. Prior to the possible need for the hard disk drive 207, the sub CPU 202 delivers power to the hard disk drive 207 from the DC power supply 211 and activates a cylinder; thus the main CPU 201 can access the hard disk drive 207 to start printing as soon as being activated.

The controller application specific integrated circuit (controller ASIC) 208 is a circuit designed and produced to control the motor controller 206a, the paper feeder controller 206b, and the fuser controller 206c.

Hereinafter, a preceding packet, which is generated by the printer driver 11 of the information processing apparatus 1 prior to a print job packet, will be described.

The printer driver 11 recognizes that a user creates a print job and gives an instruction for printing before the printing apparatus 2 recognizes the same. The printer driver 11 then transmits a preceding packet to the sub CPU 202 for proxy response prior to transmitting a packet (a print job packet) containing a set of necessary information for printing which is described in page description language (PDL).

The preceding packet includes the following information: a power supply start command that instructs to activate the relay 210 to deliver power to the engine 206 from the first power supply circuit 204; and a hard disk activation command that instructs to activate the hard disk drive 207 by delivering power to the hard disk drive 207 from the DC power supply 211. Specifically, these are a command containing a description of a time (an opportune time) for activating the relay 210 and a command containing a description of a time (an opportune time) for activating the hard disk drive 207.

The preceding packet is preferably constructed in, but is not necessarily limited to, simple network management protocol (SNMP) so that the information processing apparatus 1, which is comprised of a personal computer, can generate such a preceding packet without any difficulty.

Figure 3A:
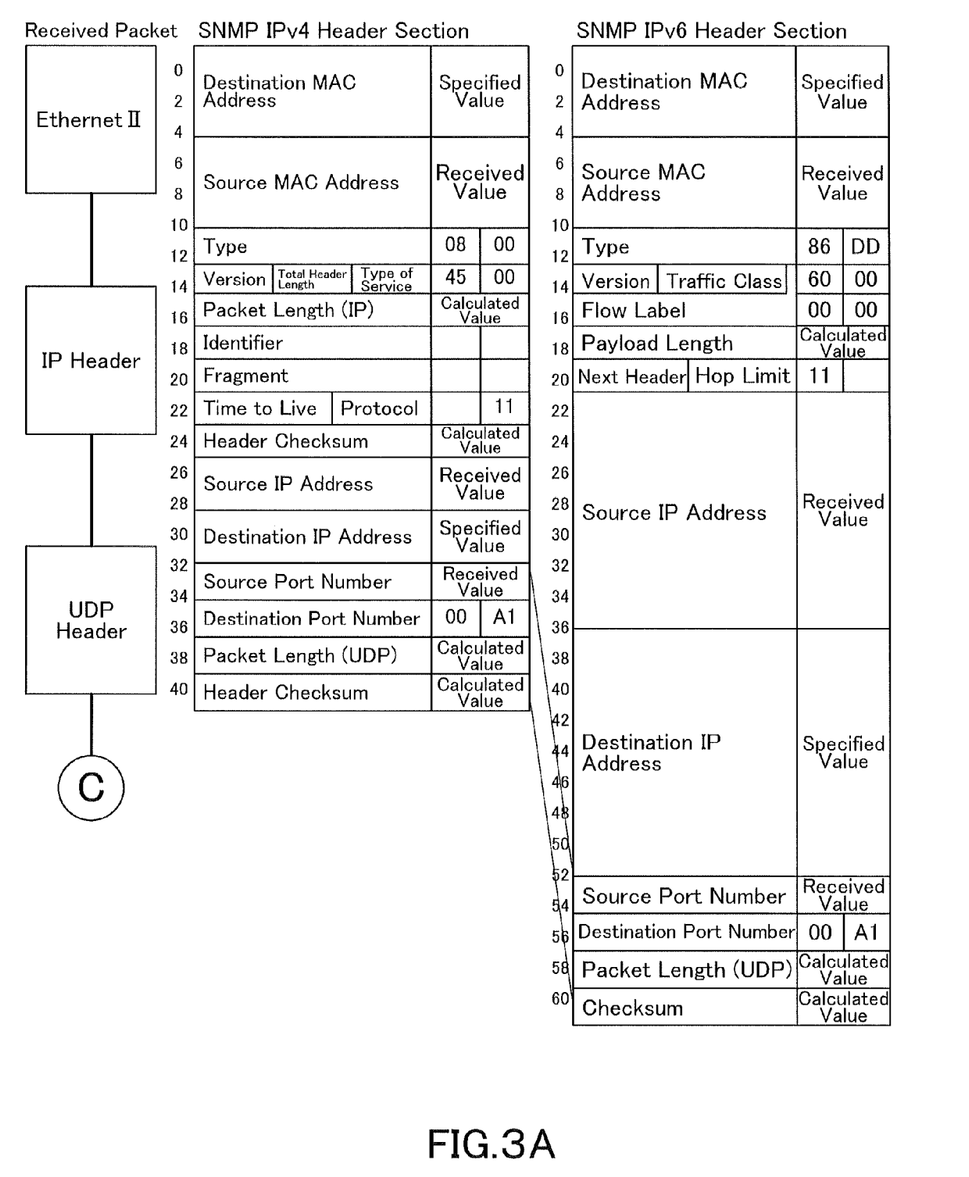
FIGS. 3A and 3B illustrate a structure of a preceding packet constructed in SNMP.
Figure 3B:
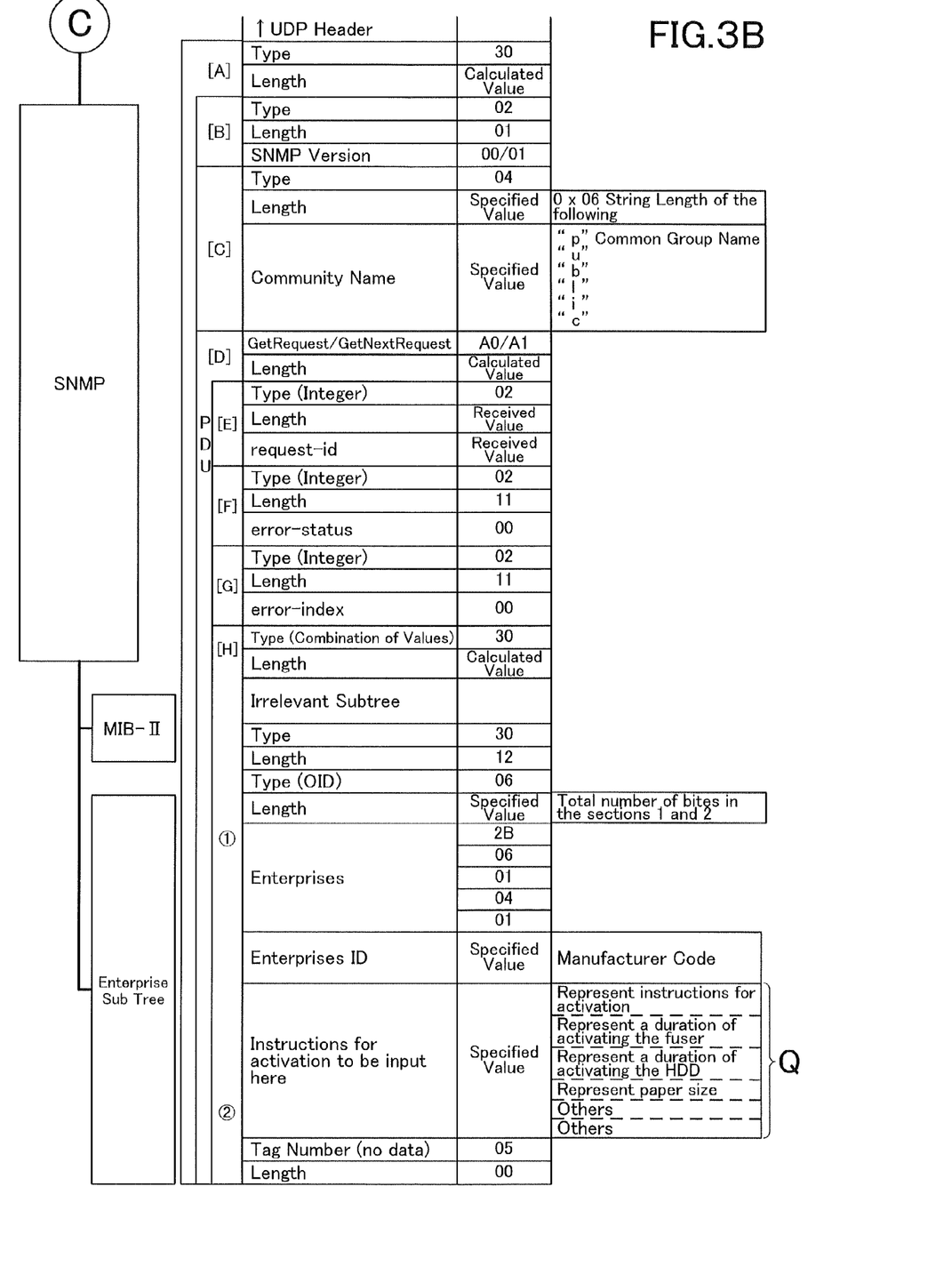

FIG. 3A is a structure of a preceding packet constructed in SNMP, and FIG. 3B is continuing figure of FIG. 3A.

A SNMP packet contains a UDP header; a SNMP description section; and one or more MIB information sections, in this order. The MIB information section has a common MIB tree and an enterprise tree that can freely be defined by the manufacturer. In this embodiment, the enterprise tree contains information Q including the power supply start command and the hard disk activation command as described above.

Hereinafter, an operation of the printing system of FIG. 1 will be described with reference to FIG. 4 which illustrates timeline charts from receipt of a preceding packet to finish of printing.

The printing apparatus 2 is in power saving mode, deep sleep mode for example. In this mode, all the portions including the main CPU 201, but excluding the sub CPU 202, the main memory 203, and the second power circuit 205, do not receive power.

When a user creates a print job and instructs the printing apparatus 2 to execute the print job by operating the information processing apparatus 1, the printer driver 11 generates a print job packet.

Prior to transmitting the print job packet, the printer driver 11 generates a preceding packet in SNMP or another protocol, which includes a power supply start command for the engine 206 and others and a hard disk drive activation command, and transmits the preceding packet to the printing apparatus 2 (the network 3). The printer driver 11 subsequently transmits the print job packet to the same.

Figure 4:
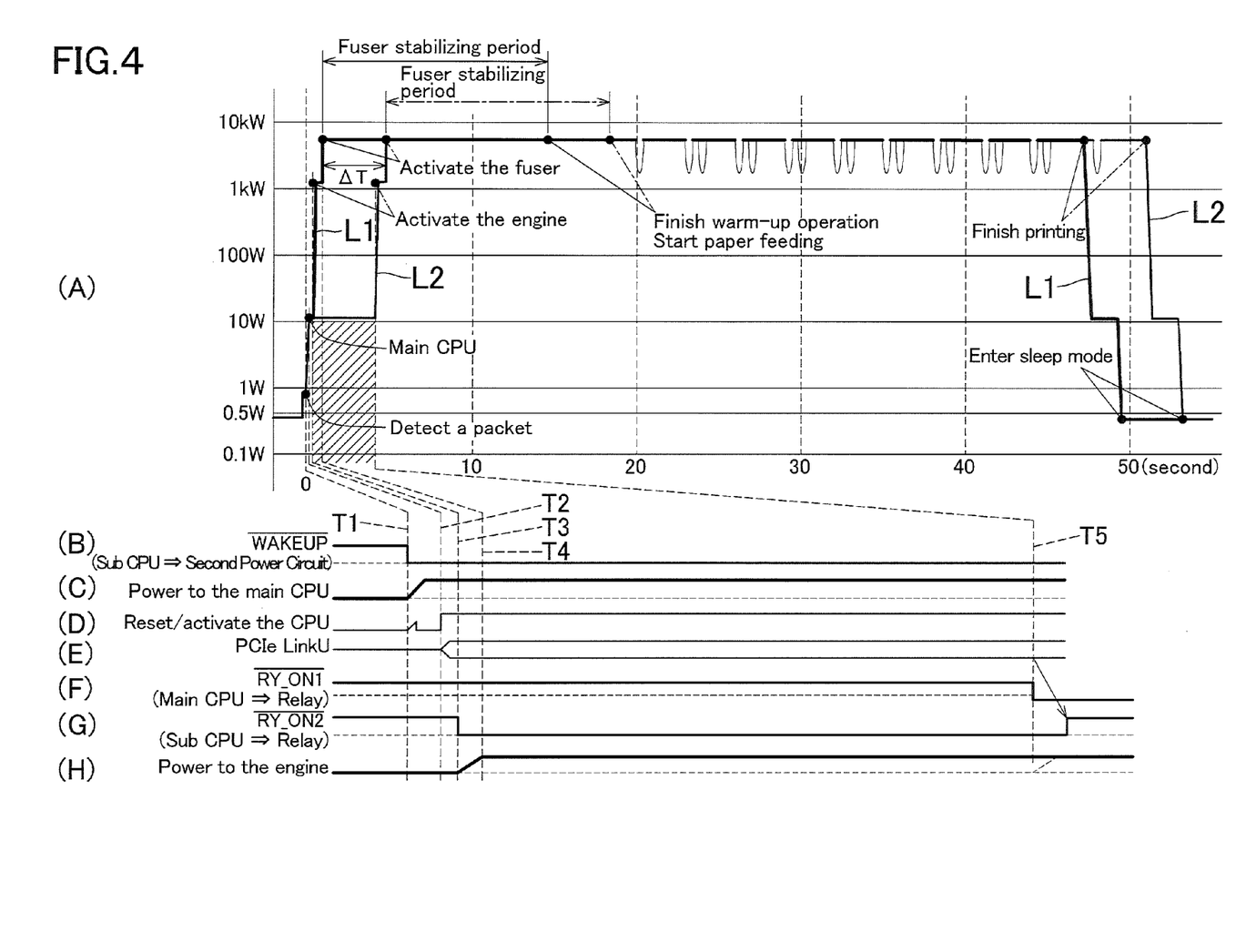

The printing apparatus 2 receives the preceding packet therefrom (at a time T1, FIG. 4); the sub CPU 202 outputs a WAKEUP signal to the second power circuit 205 (FIG. 4B) to provide power to the main CPU 201 (FIG. 4C). As a result, the main CPU 201 and its peripheral circuitry including the controller ASIC 208 are successfully reset and activated (at a time T2, FIG. 4D). Meanwhile the sub CPU 202 analyzes the preceding packet.

The sub CPU 202 further receives the print job packet from the printer driver 11 of the information processing apparatus 1 and transfers it to the main CPU 201 through PCI-Express (FIG. 4E).

As a result of the analysis, the sub CPU 202 recognizes that the preceding packet includes a power supply start command for the engine 206 and others and a hard disk activation command. Subsequently, the sub CPU 202 outputs ON signals for the first switching element 212 and the second switching element 214 to the first OR circuit 213 and the second OR circuit 215, respectively, from the two GPIO output terminals (at a time T3, FIG. 4G).

Upon being turned ON because of the ON signal, the first switching element 212 closes the relay 210, allowing the first power circuit 204 to deliver power to the engine 206 and others. The engine 206 receives power from the first power circuit 204 thus the fuser is successfully activated (at a time T4, FIG. 4H).

Meanwhile the main CPU 201 analyzes the print job packet and judges that it is a print job packet. Subsequently, the main CPU 201 outputs ON signals for the first switching element 212 and the second switching element 214 to the first OR circuit 213 and the second OR circuit 215, respectively, from the two GPIO output terminals (at a time T5, FIG. 4F). This does not cause activation of the engine 206 and the hard disk drive 207 because the engine 206 and the hard disk drive 207 were already activated by the sub CPU 202 that received the preceding packet.

As described above, in this embodiment, prior to transmitting a print job packet, the printer driver 11 of the information processing apparatus 1 transmits a preceding packet including a command that instructs to provide power to the engine 206 of the printing apparatus 2, to the printing apparatus 2; upon receiving the preceding packet, the sub CPU 202 of the printing apparatus 2 allows the first power circuit 204 to start providing power to engine 206 by power supply start control as instructed by the command. As a result, the engine 206 starts receiving power at the time T3 and the fuser is activated at the time T4 as indicated in FIG. 4, which causes a curved line L1 of FIG. 4A representing the consumed power characteristics of the printing apparatus 2.

On the other hand, when the main CPU 201 analyzes the print job packet received after the preceding packet, judges that it is a print job packet, and eventually delivers power to the engine 206, the engine 206 starts receiving power at the time T5 as indicated in FIG. 4. That causes a curved line L2 of FIG. 4A representing the consumed power characteristics of the printing apparatus 2.

It is now understood that the engine (the fuser) is activated by the control based on a preceding packet more quickly by a time difference ΔT than it is activated by the conventional control based on analysis on a print job packet. This means, the fuser finishes warm-up operation and starts paper feeding more quickly by the time difference ΔT; i.e., the times for starting and finishing printing are brought forward by the time difference ΔT.

It is now also understood that the printer driver 11 of the information processing apparatus 1 transmits a preceding packet prior to transmitting a print job packet, but does not transmit a preceding packet prior to transmitting a non-print job packet. This means, the engine 206 is activated for a print job more quickly than it is activated for a non-print job.

It is now further also understood that the sub CPU 202 delivers power to the engine 206 quickly and power saving mode is turned ON quickly after finish of printing, and thus the main CPU 201 and its peripheral circuitry consume power for a shorter time period. This means, the main CPU 201 achieves less power consumption, by an amount indicated by a shaded area in FIG. 4, than that in the case where the main CPU 201 delivers power to the engine 206 after judging that it is a print job packet.

Furthermore, in this embodiment, the preceding packet includes a hard disk activation command that instructs to activate the hard disk drive 207; upon receiving the preceding packet, the sub CPU 202 of the printing apparatus 2 starts activating the hard disk drive 207 by activation start control as instructed by the hard disk activation command. In other words, upon receiving the preceding packet, the sub CPU 202 activates the hard disk drive 207 quickly before the main CPU 201 judges that it is a print job packet. As a result, the main CPU 201 quickly accesses the hard disk drive 207 to develop print data stored thereon into a printable image, which also causes the time for starting printing move forward.

As for product life, in this embodiment, the main CPU 201 and the controller ASIC 208 do not receive power while power saving mode is ON, and thus the repetition of sleepwake cycle can make the product life of the main CPU 201 and the controller ASIC 208 shorter than that of the printing apparatus 2.

Figure 5:
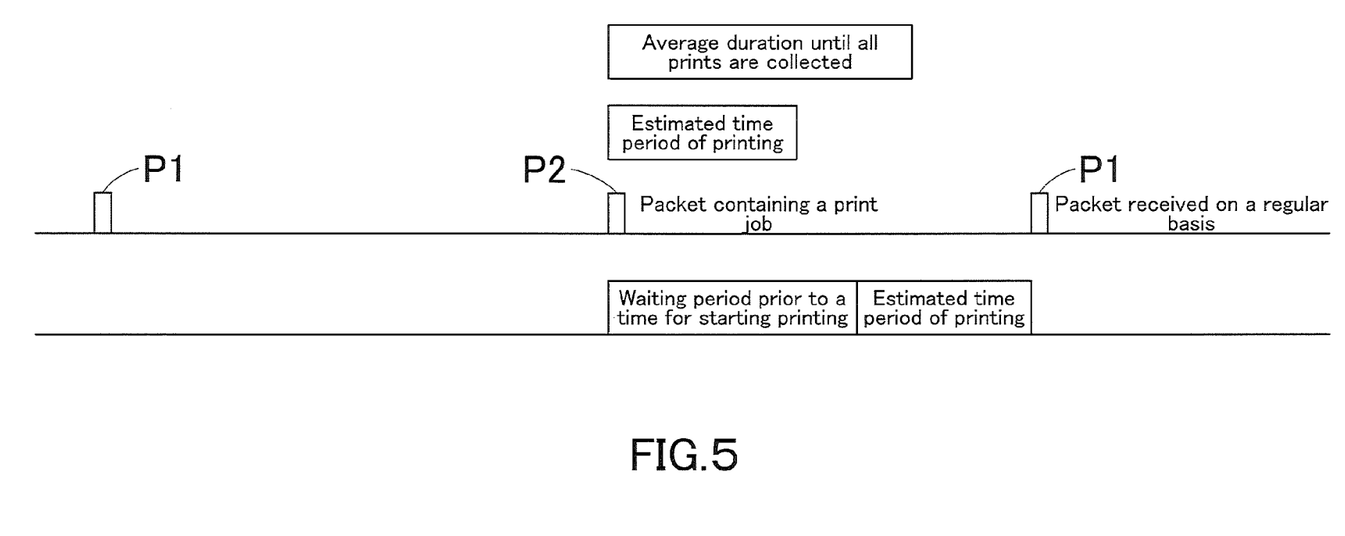
FIG. 5 is a timeline chart showing the relationship between a time for receiving a print job packet, which causes start of printing, and a time for receiving a regular packet.

This embodiment suggests a solution to such a problem, as to be described below. The printer driver 11 transmits a notice of a target number of prints to the sub CPU 202 and the sub CPU 202 estimates a time for finishing printing. If it is close to a regular time for waking up the main CPU 201 or an estimated time for receiving a packet P1 having a high degree of regularity (FIG. 5), such as a mDNS packet, the sub CPU 202 adjusts a time for starting printing such that a time period of printing includes the regular time for waking up the main CPU 201 or the estimated time for receiving a packet P1. If the difference, between the time a packet P2 containing a print job is received and the estimated time for receiving the regular packet P1 is shorter than a sum of an estimated time period of printing, which is received over SNMP, and an average duration until all copies are collected, the sub CPU 202 adjusts the time for starting printing such that the time for finishing printing matches the estimated time for receiving the regular packet P1, as indicated in FIG. 5. As a result, the main CPU 201 is activated less frequently.

The sub CPU 202 adjusts a time for starting printing on the basis of an average duration until all prints are collected by user. The sub CPU 201 stores received packets on a memory of the sub CPU 201 or a cloud storage and waits until the regular time for waking up the main CPU 210. This aims at limiting the number of times of activation such that it is less than a maximum number per day that is calculated on the basis of the product life; thus, if the number of times of activation is already less than the maximum number per day, it should be totally pointless to implement the solution.

While one embodiment of the present invention has been described in detail herein and shown in the accompanying drawings, it should be understood that the present invention is not limited to the foregoing embodiment.

In this embodiment, for example, a preceding packet includes both of the following information objects: a command that instructs to start providing power to the engine; and a command that instructs to start activating the hard disk drive. A preceding packet alternatively may include only a command that instructs to start providing power to the engine.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g."

What is claimed is:

1. A printing system comprising an information processing apparatus and a printing apparatus, the information processing apparatus and the printing apparatus both being capable of being connected to each other through a network,
the information processing apparatus comprising a printer driver that transmits a print job packet to the printing apparatus, the print job packet containing a print job described in printer description language,
the printing apparatus comprising:
an engine including a fuser;
a main CPU that performs operation control of the engine, the operation control including energization control;
a power supply portion that performs the following: providing power to the main CPU and delivering power to the engine by the main CPU performing the energization control while normal operation mode is ON; and shutting down power to the main CPU and the engine while power saving mode is ON; and
a sub CPU that performs the following: receiving power from the power supply portion while power saving mode is ON; and giving a proxy response to the print job packet to activate the main CPU, the print job packet being received from the information processing apparatus, the sub CPU consuming less power than the main CPU,
wherein:
the printer driver of the information processing apparatus further transmits a preceding packet, which does not contain the print job, to the printing apparatus prior to transmitting the print job packet, the preceding packet including a command that instructs the printing apparatus to provide power to the engine; and
upon receiving the preceding packet, the sub CPU of the printing apparatus allows the power supply portion to start providing power to the engine by energization start control as instructed by the command.

2. The printing system as recited in claim 1, wherein the preceding packet is constructed in Simple Network Management Protocol (SNMP).

3. The printing system as recited in claim 1, wherein:
the printing apparatus further comprises a hard disk drive;
the power supply portion shuts down power to the hard disk drive while power saving mode is ON;
the preceding packet further includes a hard disk activation command that instructs the printing apparatus to activate the hard disk drive; and upon receiving the preceding packet, the sub CPU of the printing apparatus performs activation start control for starting activation of the hard disk drive as instructed by the hard disk activation command.

4. A printing apparatus capable of being connected to an information processing apparatus through a network, the information processing apparatus comprising a printer driver that transmits a print job packet to the printing apparatus, the print job packet containing a print job described in printer description language, the printing apparatus comprising:
   an engine including a fuser;
   a main CPU that performs operation control of the engine, the operation control including energization control;
   a power supply portion that performs the following: providing power to the main CPU and delivering power to the engine by the main CPU performing the energization control while normal operation mode is ON; and shutting down power to the main CPU and the engine while power saving mode is ON; and
   a sub CPU that performs the following: receiving power from the power supply portion while power saving mode is ON; and giving a proxy response to the print job packet to activate the main CPU, the print job packet being received from the information processing apparatus, the sub CPU consuming less power than the main CPU,
   wherein:
   the printer driver of the information processing apparatus further transmits a preceding packet, which does not contain the print job, to the printing apparatus prior to transmitting the print job packet, the preceding packet including a command that instructs the printing apparatus to provide power to the engine; and
   upon receiving the preceding packet, the sub CPU allows the power supply portion to start providing power to the engine by energization start control as instructed by the command.

5. The printing apparatus as recited in claim 4, wherein the preceding packet is constructed in Simple Network Management Protocol (SNMP).

6. The printing apparatus as recited in claim 4, further comprising a hard disk drive, wherein:
   the power supply portion shuts down power to the hard disk drive while power saving mode is ON;
   the preceding packet further includes a hard disk activation command that instructs the printing apparatus to activate the hard disk drive; and
   upon receiving the preceding packet, the sub CPU performs activation start control for starting activation of the hard disk drive as instructed by the hard disk activation command.

7. The printing system as recited in claim 1, wherein:
   the printer driver transmits the preceding packet to the printing apparatus upon accepting manipulations performed by a user; and
   the printer driver transmits the print job packet to the printing apparatus upon accepting information input by the user, the information being necessary for execution of the print job.

8. The printing apparatus as recited in claim 4, wherein
   the printer driver transmits the preceding packet to the printing apparatus upon accepting manipulations performed by a user; and
   the printer driver transmits the print job packet to the printing apparatus upon accepting information input by the user, the information being necessary for execution of the print job.

* * * * *